United States Patent [19]

Tallman

[11] Patent Number: 4,835,969
[45] Date of Patent: Jun. 6, 1989

[54] ERROR DETECTION MEANS FOR AN OVERSPEED GOVERNOR

[75] Inventor: Jack A. Tallman, Niles, Mich.

[73] Assignee: Allied-Signal Inc., Morristown, N.J.

[21] Appl. No.: 104,137

[22] Filed: Oct. 5, 1987

[51] Int. Cl.⁴ .............................................. F02C 9/28
[52] U.S. Cl. .................................................. 60/39.281
[58] Field of Search ............................. 60/39.281, 243

[56] References Cited

U.S. PATENT DOCUMENTS

| | | |
|---|---|---|
| 4,578,945 | 4/1986 | Peck et al. .......................... 60/39.281 |
| 4,716,723 | 1/1988 | Ralston et al. .................... 60/39.281 |
| 4,718,229 | 1/1988 | Riley ................................. 60/39.281 |
| 4,738,579 | 4/1988 | D'Agostino et al. ............. 60/39.281 |

Primary Examiner—Louis J. Casaregola
Attorney, Agent, or Firm—Leo H. McCormick, Jr.; Ken C. Decker

[57] ABSTRACT

In the fuel management system having an electronic computer (36) for operating a metering valve (50) through which fuel is supplied to operate a turbine engine (10). A mechanical governor (116) responsive to the rotation of a turbine by the combustion of fuel supplied to chamber (16) allows a portion of the fuel supplied to the metering valve (50) to return to a pump supply (30) when the rotational speed of the shaft (20) connected to turbine (18) exceeds a preset valve. An error detection member (440) responds to a mismatch between the force output of flyweight (130) and a speed feedback roller (408) to prevent the return of the entire quantity of fuel to the pump supply (28) and thereby assure a minimum quantity is always available to operate the turbine engine (10).

8 Claims, 3 Drawing Sheets

ERROR DETECTION MEANS FOR AN OVERSPEED GOVERNOR

This invention relates to a speed member to detect an error or malfunction caused by a broken component in an overspeed governor of a fuel management system having an electronic computer as the primary control of fuel to a turbine engine.

Every turbine engine has an optimum fuel to air ratio for operation that can produce a desired thrust. It is normal for a fuel management system to include can electronic sensing and signal computer which receives electrical signals representing variable engine operating conditions such as engine speed, power lever position, compressor inlet air temperature, altitude and other engine variables. The electronic computer evaluates these inputs and operates a metering valve such as disclosed in U.S. Pat. No. 4,245,462 to supply the optimum fuel to operate a turbine engine.

The rotation of the turbine in the engine can broadly be stated as a function of the fuel supplied from the metering valve. Most turbines are designed to operate at some rotational speed above their normal rotation in order to provide an additional amount of thrust for a short period of time without damaging the turbine.

It is common practice to provide a fuel management system for a turbine engine in an aircraft, with a mechanical back-up system, should an electrical failure occur in the primary control for the metering valve. This back-up system acts to limit the amount of fuel to operate the turbine but does not include many of the inputs that provide for the optimum operation.

It has been observed that an electrical error signal supplied to an on board computer can result in more fuel being supplied to the turbine than actually is desired for optimum operating conditions. Since the amount of fuel supplied to a turbine engine essentially controls the turbine speed if the amount of fuel supplied exceeds the optimum fuel, an overspeed condition may result.

In order to protect the turbine engine from an overspeed operation when operating in the electrical mode, a mechanical overspeed governor system disclosed in copending U.S. patent application Ser. No. 80,728 has been devised.

This mechanical overspeed governor system includes a flyweight speed mechanism, a cam member, an integrator piston, a proportional valve, an integral valve, and a flapper valve.

The flyweight speed mechanism receives an input from the turbine engine to sense the actual rotation of the turbine in response to fuel currently supplied as a result of the position of a metering valve by an electronic resolver. The flyweight speed mechanism moves a first valve to allow operational fluid to move an actuator and rotate the cam member to a position corresponding to the rotation of the turbine. A feedback mechanism responsive to a first contour on the cam member opposes the movement of the first valve to interrupt the flow of operational fluid to the actuator once the current speed position has been achieved.

A second contour on the cam member provides the proportional valve with an input corresponding to the actual speed of the turbine. During normal operation of the turbine, the proportional valve inhibits the communication of an operational fluid from a head sensor to a return conduit connected to a supply reservoir. Should an overspeed rotation of the turbine be indicated by the speed position of the second contour, the proportional valve opens a port to develop a pressure drop in the operational fluid at a head sensor and a bypass valve. The pressure drop at the bypass valve moves a piston to allow a portion of the fuel supplied to the metering valve to flow to the return conduit. Thus, even though the metering valve remains stationary in the position established by the electronic resolver, the fuel supplied to the turbine engine is reduced and the overspeed condition should be thereafter rectified.

Should a failure occur in either the flyweight speed mechanism or first valve, the cam member could rotate to a position indicating that the turbine is not rotating or is rotating at a speed which exceed any safe speed.

If a failure occurs such that operational fluid has rotated the cam member to a maximum speed indicating position, the proportional, integral and flopper valves operate to reduce the fluid pressure across the metering valve while allowing a portion of the supply fuel to return to pump supply. At some point in time this pressure reduction could reduce the fluid pressure to a valve such that the volume of fuel supplied to operate the turbine engine would be insufficient to maintain a desire minimum speed.

SUMMARY OF INVENTION

An error detection member has been added to the feedback mechanism. The feedback mechanism is designed such that when the cam member has rotated to a position corresponding to the speed of the turbine, the input force from the flyweight is balanced and the operational fluid which moves the cam member is terminated.

A valve having a bore therein with an entrance port connected to the exit port of the proportional valve and an exit port connected to the return conduit is located in the mechanical governor mechanism. A beam extends from a lever in the feedback mechanism to a position adjacent the valve. A spring acts on a roller to provide the lever with a feedback force which balances the input from the turbine engine. If the cam member has rotated to its maximum position to indicate an overspeed condition exists, the feedback force attempts to balance the input force from the flyweight. In this situation, operational fuel is allowed to flow from supply to lower the amount of fuel supplied to the turbine engine. If there is a failure in the flyweight sensor, the spring acts on the lever to move the beam into engagement with a piston in the bore of the error detection valve. Movement of this piston interrupts the flow of operational fluid from the proportional valve to assure that the operational fluid pressure does not drop below a minimum value.

It is an object of the invention to provide a mechanical governor in an electronic fuel control system with an error detection valve to prevent the mechanical governor from providing a bypass valve with an operational input such that the entire supply of operational fuel is diverted to a reservoir than being supplied to a turbine engine.

An advantage of the mechanical governor with an error detection valve is that a minimum quantity of fuel is always available to operate the turbine.

These objects and advantages should be apparent from reading this specification while viewing the drawing wherein.

DETAILED DESCRIPTION OF THE INVENTION

Figure 1:
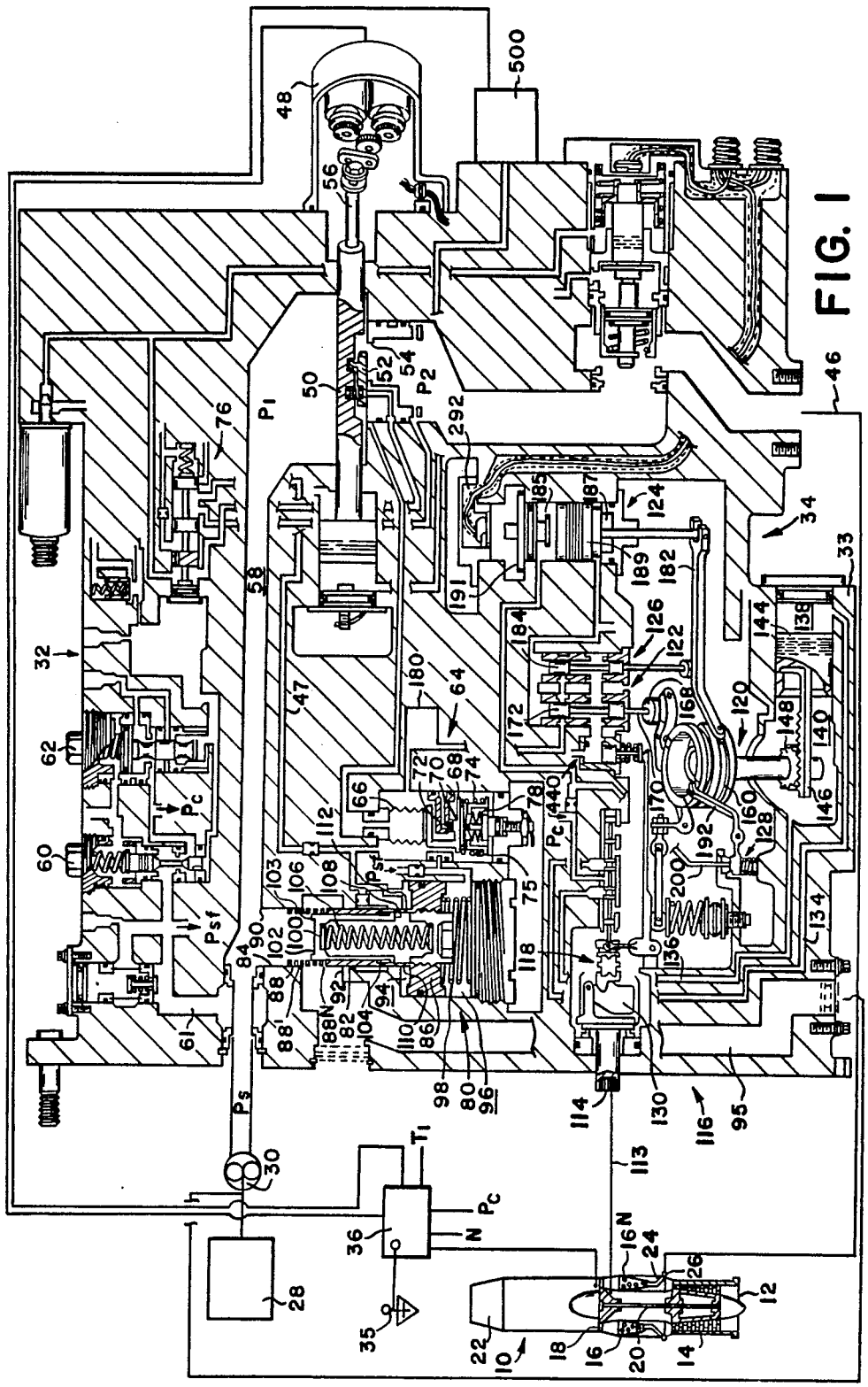
FIG. 1 is a schematic representation of a fuel management system for a turbine engine having a mechanical governor with an error detection valve made according to the principals of this invention.

A conventional gas turbine engine 10 shown in FIG. 1 has an air inlet 12, an air compressor 14, a plurality of combustion chambers 16, $16^N$, a gas turbine 18 connected via a shaft 20 to the compressor 14 to drive the same, and an exhaust nozzle 22 from which the products of combustion are expelled to the atmosphere. A plurality of fuel injection nozzles 24 connected to a fuel manifold 26 are adapted to inject metered pressurized fuel into the combustion chambers 16, $16^N$ where the resulting air fuel mixture is burned to generate hot motive gas that passes through turbine 18 to drive compressor 14 and are exhausted through nozzle 22 into the atmosphere to generate a propelling thrust.

A metered flow of fuel is supplied to fuel manifold 26 from fuel tank 28 by an engine driven fuel pump 30 of the positive displacement type. A fuel management system 32 including a hydromechanical governor control section 34 and an electronic sensing and signal computer 36 which controls the flow of fuel to the fuel manifold 26.

The electronic sensing and signal computing section 36 is structurally and operationally conventional in that it receives electrical input signals representing selected variable conditions of engine operation as for example, engine speed N, compressor discharge air pressure $P_c$, power lever 35 position PLA and compressor inlet air temperature $T_i$ or other engine temperatures. The electrical input signals are sensed and compared electronically in a conventional manner resulting in a computed electrical signal which may be suitably amplified and discharged as an electrical output signal to operate the electrohydraulic servo valve 500 and the resolver 48 which position a metering valve 50 to control the flow of fuel to the fuel manifold 26 by way of conduit 46.

The metering valve 50 has a flat plate 52 that controls the flow of fuel through a triangular shaped port 54 to conduit 46 in response to movement of stem 56 by the operation of the resolver 48 in response to an input from the electronic computer 36.

A portion of the fuel flowing from pump 30 is diverted through conduit 61 to servo regulator valves 60 and 62 to provide an operational fluid having a substantially constant pressure $P_c$. When the supply fuel reaches the metering valve 50 through conduit 58 it has a fluid pressure $P_1$. The restricted flow of the fuel through port 54 produces a pressure drop such that the fuel supplied to the fuel manifold now has a fluid pressure $P_2$.

The rotation of shaft 20 in turbine engine 10 is a direct function of the position of metering valve plate 52 and the pressure differential $(P_1-P_2)$ established across metering valve plate 52.

A head sensor 64 has a bellows 66 which receives the fluid pressure $P_1$ from the metering valve 50 and acts on a movable member 68. Moveable member 68 has a face 70 which is urged toward seat 72 by an adjustable spring 74 and the fluid pressure $P_2$ which is communicated from conduit 46 by way of conduit 47 connected to shut off shuttle valve 76. A series of bi-metal disc 78 concentrically positioned inside spring 74 provides for changes in temperature that could affect the specific gravity of the fuel supplied to fuel manifold 26.

A bypass valve 80 of the type disclosed in U.S. Pat. No. 3,106,934 is connected to the head sensor 64 has a sleeve 82 located in a bore 84. Sleeve 82 is of the integrating and proportional flow type disclosed in U.S. Pat. No. 3,106,934 which is attached to an integrator piston 86 which separates $P_2P$ chamber 94 from a reference or $P_x$ chamber 96. Sleeve 82 has a series of openings 88, 88' ... $88^N$ located adjacent to the end thereof to control communication from bore 84 to port 92 in return conduit 95 connected to reservoir 28. A spring 98 in $P_x$ or reference chamber 96 and the fluid pressure $P_{sf}$ (fluid from conduit 61 prior to passing through regulator 60) act on and urges integrator piston 86 toward chamber 94 in opposition to the fluid pressure $P_2P$ located in chamber 94. A proportional piston 100 located in sleeve 82 has a face 102 on one end and a lip 104 on the other end. A spring 106 is located between integrator piston 86 and the proportional piston 100. The fluid pressure $P_2P$ in chamber 94 is communicated to the interior of sleeve 82 by openings 110 and 112. Spring 106 and fluid pressure $P_2P$ act on proportional piston 100 to urge lip 104 toward a shoulder 108 on the sleeve 82 in opposition to the fluid pressure $P_1$ in the supply fuel at port 90 in conduit 58. Depending on the fluid pressure $P_2P$ acting on integrator piston 86, the sleeve 82 moves to provide communication from bore 84 through openings 88, 88' ... $88^N$ to the port 92. At the same time the pressure differential between the fuel supply $P_1$ and the fluid pressure $P_2P$ acting on piston 100 move face 102 to define the number of openings 88, 88' ... $88^N$ through which fuel may flow to the return conduit 95.

The fuel supplied to turbine engine 10 causes shaft 20 to rotate. Rotation of shaft 20 is transmitted through flexible conduit 113 to shaft 114 of the mechanical governor system 116.

The mechanical governor system 116, which includes a flyweight speed mechanism 118, a cam 120, a proportional valve 122, an integrator piston 124 and valve 126 and a flapper valve 128, responds to the rotation of the shaft 20 to prevent an overspeed condition from occurring during operation of the metering valve 50 by the electronic resolver 48 in response to an input signal from computer 36.

The flyweight speed mechanism 118 provides the operational input or speed signal for mechanical governor system 116. The shaft 114 rotates as a function of the rotation of shaft 20 in the turbine 10 to move weight 130. Linkage 139 responds to movement of flyweight 130 to move and position slide valve 132. Movement of slide valve 132 controls the flow of operational fluid having a fluid pressure $P_c$ (fluid from regulator 60) to either conduit 134 or 136 connected to chambers 138 and 140, respectively of cam member 120.

Actuator piston 144 which separates chambers 138 from chamber 140 has a rack member 146 which engages gear 148 to rotate shaft 150. A cylinder 152 attached to shaft 150 has four contoured surfaces 154, 156, 158 and 160 thereon. Piston 144 is moved by the fluid pressure $P_c$ of the operational fluid movement of piston 144 correspondingly moves rack 146 to rotate shaft 150 and positions the contours 154, 156, 158 and 160 on the cylinder 152 to a location corresponding to the rotation of shaft 20 in the turbine engine 10.

Feedback mechanism 162 has a lever 400 with a first end 402 that is located in contour 154 and a second end 404. A pin 406 extends through lever 400 and locates the lever 400 on a fixed support within the body 33 of the hydromechanical governor of control section 34. End 404 has an opening which is located a push rod 408. Push rod 408 has a roller 410 on one end and adjustable nuts 412 and 414 on the other end. Roller 410 rides on platform of lever 416 which is attached to the end of spring 418. A pair of bi-metal discs 420 and 422 which provide for changes in the temperature of the fluid in body 33 are located on an adjustable end member 424 that is located on fixture 426. A yoke 428 that extends from a collar member 430 attached to the body 33 by pin 432 engages linkage 139. Arm 434 which extends at a substantially right angle from yoke 428 has an extension or beam 438 attached thereto. Roller 410 is held in engagement with arm 434 and provides a balance force to the input from flyweight 130. The end 436 of beam 438 is located adjacent the error detection valve 440.

The error detection valve 440 has a housing 442 with a bore 444 located therein. An entrance port 446 for valve 440 is connected to exit port 173 of the proportional valve 122 while exit port 448 is connected to the interior of body 33. A piston 450 located in bore 444 is urged toward a stop 452 by a spring 454 located between housing 442 and end cap 456 on shaft 458.

Contour 156 has linkage 168 which is connected to shaft 170 of the proportional valve 122.

Proportional valve 122 has a land 172 which moves past port 174 to connect chamber 75 in the head sensor 64 with the body 33 of the control 34 through exit port 448 in the error detection valve 440.

The entrance port 174 has a rectangular opening and a triangular opening. The rectangular opening is designed to be opened first and initiate flow from accumulator 180 associated with head sensor 64. If the movement of land 172 by linkage 168 is large, flow occurs through both the rectangular and triangular openings to provide for an initial pressure drop in the fluid pressure from $P_2$ to $P_2P$.

Contour 160 has linkage 182 that is connected to both the integrator piston 124 and integrator valve 126. The integrator piston 124 separates a first chamber 185 from a second chamber 187. Chamber 185 receives operational fluid having a fluid pressure $P_c$ while chamber 187 receives operational fluid from regulator 62 having a fluid pressure $P_{CR}$ which is a substantially constant and regulated fluid pressure. Movement of linkage 182 by integrator piston 124 is designed to be at about a 4:1 ratio of the movement of integrator valve 126. Valve 126 has a land 184 which moves to open port 186 and provides an additional flow path for operational fluid from accumulator 180 to the body 33 through passage 190 which connects to bore 188 to port 173. With the flow of operational fluid through port 186 to port 173, the fluid pressure drop from $P_2$ to $P_2P$ rapidly increases.

Contour 158 has linkage 192 that is connected to flapper valve 128. A spring 194 urges a face 196 against a seat 198 on conduit 200 connected to chamber 185. As linkage 192 moves in contour 158, face 196 moved away from seat 198 to lower the fluid pressure in chamber 185 and allow the integrator piston 124 to move toward chamber 185.

MODE OF OPERATION OF THE INVENTION

An operator supplies an operational input to power lever 35 to provide the electronic computing section 36 with an input. This input along with other operating parameters such as atmospheric air pressure, compressor discharge pressure, engine speed, inlet air temperature, altitude and engine temperature are evaluated in the development of an operational signal that is supplied to electronic computer 36 which supplies input to electrohydrical servo valve 500 resolver 48 which moves metering valve 50 to define the opening of port 54 for the flow of fuel into conduit 46 connected to the fuel manifold 26. The fuel supplied to fuel manifold 26 is burned in chamber 16 causing an expansion of the gases therein, which on existing nozzle 22 rotates shaft 20. The rotation of shaft 20 is directly proportional to the fuel supplied to manifold 26. The restriction of the flow of fuel through port 54 causes a pressure drop to occur across the metering valve 50 such that the fuel in conduit 58 has a fluid pressure of $P_1$ and the fuel in conduit 46 has a fluid pressure of $P_2$.

Fluid pressure $P_1$ is communicated to bellows 66 in head sensor 64, while fluid pressure $P_2P$ is communicated to and acts on head sensor bellows 66 by way of shut off shuttle valve 76 and conduit 47. The pressure differential acting on the moveable member 68 positions face 70 against seat 72 to prevent the communication of operational fluid having a fluid pressure $P_{sf}$ to chamber 75. At the same time, fluid pressure $P_2P$ is communicated to chamber 94 in the bypass valve 80 to act on both integrator piston 86 and proportional piston 100 to position sleeve 82 and lip 103 with respect to port 92 and set the size of the opening to return conduit 95. The integral piston 86 which is controlled by the sensor 64 holds the pressure drop across the bellows 66 constant.

Rotation of shaft 20 is carried to the governor flyweight speed sensor 118 by flexible shaft 113. The weight 130 moves out to push the spinning slide valve 132 such that land 135 moves past seat 137 to allow fluid having a fluid pressure $P_c$ to flow to chamber 138 while at the same time land 133 moves past seat 131 to open chamber 140 to the body pressure $P_B$. The pressure differential $P_c$-$P_B$ acts on piston 144 to move rack 146 and rotate cam 120 such that the first 154, second 156, third 158 and fourth 160 contours provide an operational input to the flyweight mechanism 118, proportional valve 122, flapper valve 128, and the checkout feature of integrator piston 124.

End 402 on lever 400 moves in contour 154 causing end 404 to move linearly as the lever pivots on pin 406 to change the position of roller 410 with respect to arm 434 and rotate yoke 428 about pin 432 to provide a reaction force which balances the force of the weight 130 on slide valve 132.

When the feedback force is equal to the force of weight 130, lands 133 and 135 move and close ports 131 and 137 and interrupt communication of fluid pressure $P_C$ to chamber 138.

During normal operation of the turbine engine, that is when the rotation of shaft 20 is below a fixed rotation, contours 156, 158 and 160 are designed to hold the proportional valve 122, integral valve 126 and integral piston 124 and flapper valve 128 in a substantially constant position.

As long as the rotation of shaft 20 is below a preset value, the mechanical governor 116 has no effect on the flow of fuel to fuel manifold 26. Should a malfunction occur in the electronic sensing or computing section 36, which directs resolver 48 to move plate 52, such that the fuel supplied to operate the turbine engine 10 cause the rotational speed of shaft 20 to increase above the preset value, the mechanical governor 116 is activated by the rotation of the flyweight 30 acting on the slide valve 132 and movement of the cam means 120.

If the rotation of the shaft 20 is above a first limit of the preset rotation, 10% or any other limit, the overspeed governor system 116 is activated. Proportional valve 122 reacts to the position of the second contour 156 speed and is brought into operation by the second contour 156. Land 172 sequentially moves past port 174 to allow fluid to flow from reservoir 180 to the body 33 through port 448. The fluid pressure $P_1$ acting on face 102 of proportional piston 100 in bypass valve 80 moves piston 100 toward integrator piston 86 to expose more opening 88, 88' . . . $88^N$ and thereby allow a greater percentage of the fuel available in conduit 58 to flow into return conduit 95. This reduction in the volume or pounds of fuel supplied to the turbine engine 10 should result in a reduction in the rotation shaft 20.

Should the rotation of shaft 20 be such that it exceeds second limit of the preset rotation, 13% or any other desired limit, the overspeed governor system 116 allows additional fuel to flow to body 33 by opening the integral valve 126.

Proportional valve 122 is already fully opened and contour 158 moves flapper valve 128 which allows operational fluid to flow from chamber 185 to allow fluid pressure $P_{cr}$ in chamber 187 to move integral piston 124 and open integral valve 126. As piston 184 moves past port 186, additional fluid flows from reservoir 180 to further reduce the fluid pressure in chamber 94 to $P_2P$. This reduction in fluid pressure allows proportional piston 100 to further open and permit a corresponding increase in the fuel being returned in conduit 95.

Should the fuel supplied to fuel injection nozzles 24 cause shaft 20 to rotate and exceed an acceptable operation or thrust limit for the turbine engine 10, the rotation as transmitted by cable 113 to the mechanical governor system 116 causes cam member 120 to rotate and allow proportional valve 122 and integral valve 126 to fully open.

During checkout at low speed (0% to 50% speed) contour 160 resets the integrator governor valve 126 away from its opening position so that the integrator piston checkout can occur without governor action. Contour 158 acts on linkage 192 to move end 196 away from seat 198 and allow the operational fluid in chamber 185 to flow into the body 34. With flapper valve 128 opened, the fluid pressure $P_{CR}$ (fluid from regulator 62) in chamber 187 moves the integrator piston 189 into engagement with fixed cover 191 associated with sensor or switch 292. A signal from sensor 292 is transmitted to the electronic computer unit 36 to indicate this operational condition.

Figure 2:
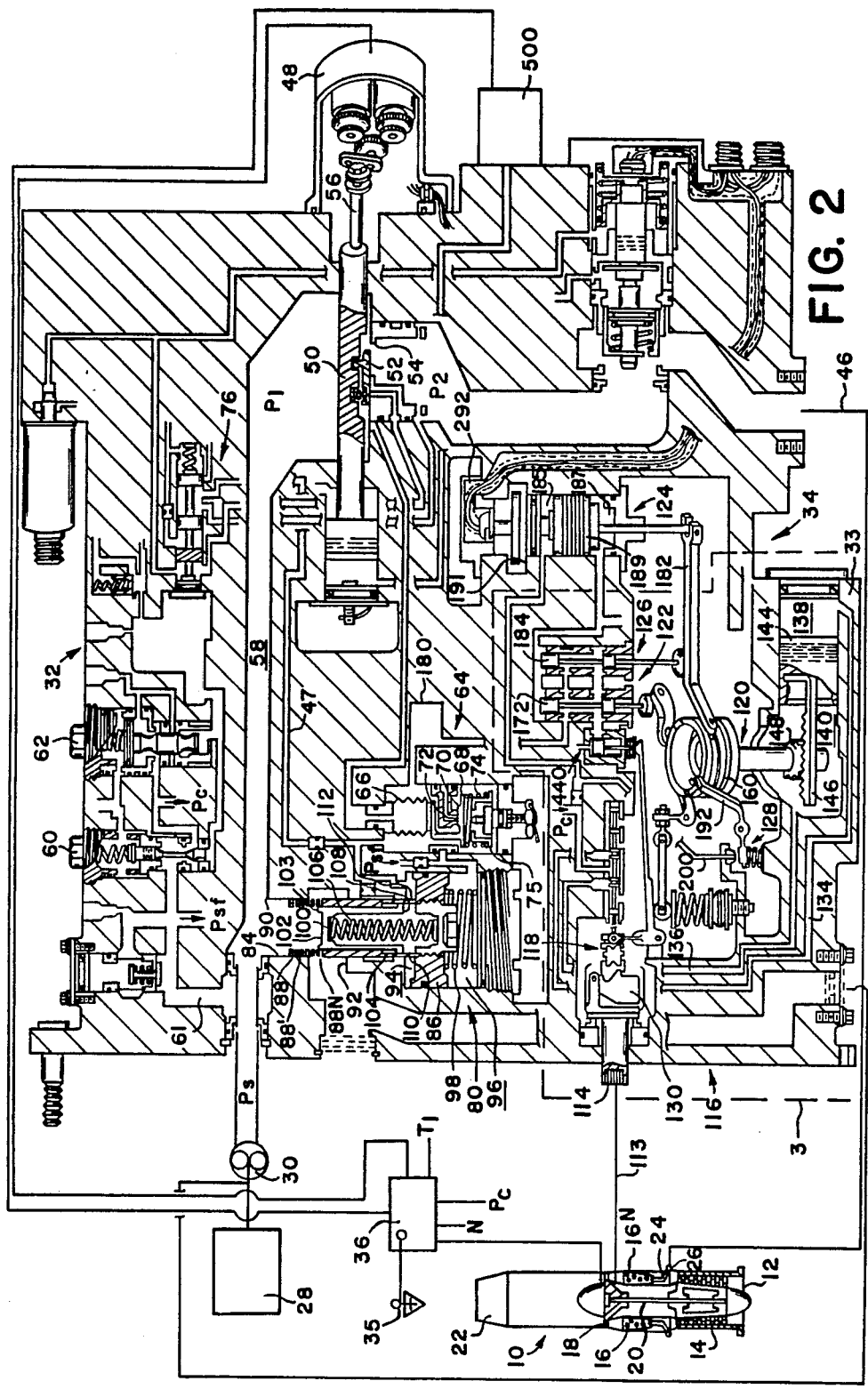
FIG. 2 is a schematic representation of the fuel management system of FIG. 1 with the error detection valve in operation.
Figure 3:
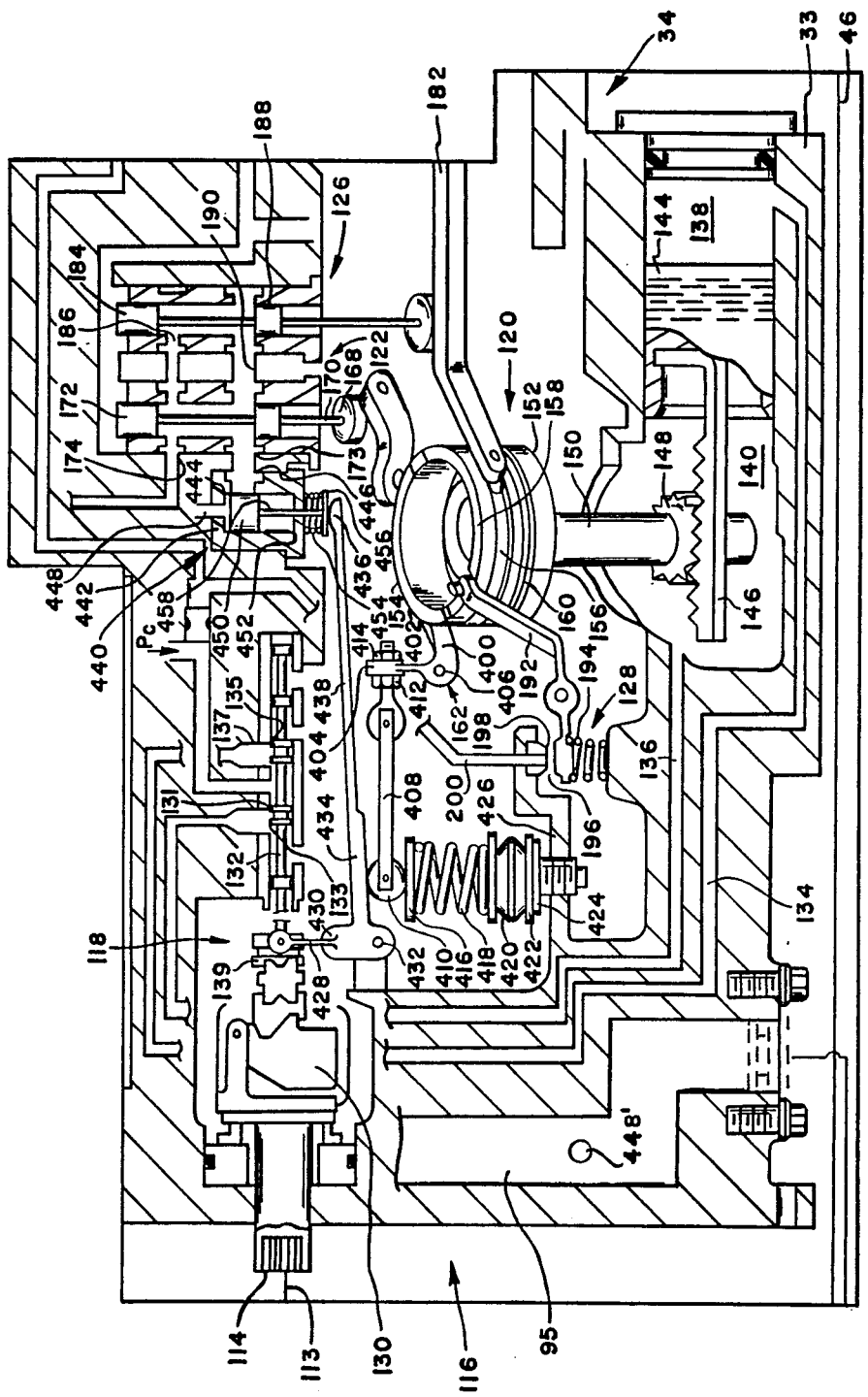
FIG. 3 is an enlarged circumscribed section 3 of FIG. 2 showing the error detection means actuated by the action of a feedback force transmitted from an operational cam.

Because of the stress and rotational forces placed on linkage 139 and shaft 132 any failure such as the separation of shaft 132 as shown in FIGS. 2 and 3 the feedback from contour 154 would not be translated into movement of shaft 132. Since communication of the operational fluid to chamber 138 is continuous, piston 144 moves cam 120 to indicate excessive turbine engine shaft 20 rotation as some time movement of, contours 154, 156 and 158 open the proportional valve 122 and, flapper valve 128 while integrator piston 124 moves to open integrator valve 126 and allow $P_2P$ to be reduced. The feedback from contour 154 while balancing the weights is not translated into movement of shaft 132 but roller 410 continues to move arm 434 while spring 418 moves the platform 416 to bring end 436 on beam 438 into engagement with end cap 456 to correspondingly move piston 450 to close entrance port 446. With entrance port 446 closed, the fluid pressure drop of the fluid in chamber 180 terminates. Thus the fluid pressure $P_2P$ is maintained at a level above $P_B$ and a flow of at least minimal operational fuel to operate the turbine engine 10 is assured.

What I claim is:

1. In a fuel management system having a source of supply fuel with a substantially constant fluid pressure, Ps, a metering valve responsive to an input from an electronic computer for supplying fuel under pressure $P_2$ to a combustion chamber in an engine, a bypass valve responsive to the fluid pressure $P_2$ for allowing a portion of the supply fuel to return to the source while a fluid differential pressure $P_1-P_2$ develops across the metering valve, a turbine responding to the combustion of fuel in said combustion chamber by rotating to drive a compressor in said engine and a mechanical governor having a speed sensor responsive to a rotational speed of the turbine above a preselected rotation for lowering the pressure differential $P_1-P_2$ across the metering valve by opening a governor valve to allow operational fluid to flow to a return having a fluid pressure $P_B$ and modify the fluid pressure $P_2$ presented to the bypass valve to $P_2P$ to allow additional fuel to return to the source resulting in a corresponding reduction in the fuel supplied to said combustion chamber independent of the operation of the metering valve by the electronic computer to prevent an overspeed condition in the turbine, the improvement comprising:

speed detection means connected to said governor valve for preventing the fluid pressure $P_2P$ of the operational fluid from reaching $P_B$ to assure that a minimum quantity of operational fluid is available to the combustion chamber.

2. In the fuel management system as recited in claim 1 wherein said speed detection means includes:

a valve having a housing with a bore therein, said bore having an entrance port for receiving the flow of the operational fluid from the governor valve and an exit port connected to said return, said operational fluid freely flowing between the entrance port and exit port when the fluid pressure changes from $P_2$ to $P_2P$.

3. In the fuel management system as recited in claim 2 wherein said speed detection means includes:

a piston located in said bore;

a spring acting on an urging said piston toward a stop to provide for said interrupted flow of the operational fluid between said entrance and exit ports and, actuation means responsive to the speed sensor for moving said piston and to close said entrance port when a malfunction is present in mechanical governor which would allow the fluid pressure $P_2P$ to go to $P_B$.

4. In the fuel management system as recited in claim 3 wherein said speed sensor includes:

cam means;

a spool having first and second lands for selectively connecting first and second ports to a source of operational fluid, a flyweight attached to a shaft that rotates as a function of the rotation of said turbine, linkage for connecting said flyweight to said spool for moving said first and second lands to allow the operational fluid to flow through one of said first and second ports and move said cam means to a position corresponding to the rotation of said turbine; and feedback means connected to said cam means for to provide said linkage with an indication of said cam means whereby said spool is moved to nullify the force of the flyweight and the flow of operational fluid through one of said first and second ports when the position of said cam means corresponds to the actual rotation of said turbine.

5. In the fuel management system as recited in claim 4 wherein said feedback means includes:

a yoke having a first end pivotally secured to a support and a second end connected to and movable with said linkage, an arm extending from said yoke;

a lever having a first end located in a speed contour on said cam means and a second end, said lever being located on a pivot pin;

a push rod connected to said second end of said lever;

a roller on the end of said push rod; and a platform for locating said roller with said arm, said rotation of said cam means causing said yoke to pivot and linearly move said roller to a said platform and provide said arm with a force that pivots said yoke to oppose and nullify the movement of said spool by the flyweight.

6. In the fuel management system as recited in claim 5 wherein said actuation means includes:

a beam that extends from said arm to a position adjacent said piston; and a spring located between said platform and a fixed support, said spring urging said platform away from said support to hold said roller in contact with said arm.

7. In the fuel management system as recited in claim 6 wherein a malfunction in said linkage that permits continued flow of operational fluid through one of said first and second ports causes the cam means to rotate to a maximum speed position where the said contour moves said lever to position said roller on said platform to pivot said yoke while said spring moves the platform to bring said beam into contact with said piston to prevent any further reduction in the fluid pressure $P_2P$.

8. In the fuel management system as recited in claim 7 further including:

switch means responsive to the position of said cam to indicate a non balance condition in the forces transmitted through said linkage which corresponds to an error in the speed sensor.

* * * * *